(12) United States Patent
Myers et al.

(10) Patent No.: US 10,910,683 B2
(45) Date of Patent: Feb. 2, 2021

(54) HEAT EXCHANGER PLATE ASSEMBLES FOR ELECTRIFIED VEHICLE BATTERY PACKS

(71) Applicant: FORD GLOBAL TECHNOLOGIES, LLC, Dearborn, MI (US)

(72) Inventors: Eric Myers, Howell, MI (US); Samuel Jeffrey Tomlinson, Farmington Hills, MI (US); Neil Robert Burrows, White Lake Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 64 days.

(21) Appl. No.: 16/194,703

(22) Filed: Nov. 19, 2018

(65) Prior Publication Data

US 2020/0161722 A1    May 21, 2020

(51) Int. Cl.
| | |
|---|---|
| *H01M 10/613* | (2014.01) |
| *H01M 10/625* | (2014.01) |
| *B60H 1/00* | (2006.01) |
| *H01M 10/6556* | (2014.01) |
| *B29C 65/00* | (2006.01) |
| *B29L 31/00* | (2006.01) |
| *B60R 16/04* | (2006.01) |

(52) U.S. Cl.
CPC ....... *H01M 10/613* (2015.04); *H01M 10/625* (2015.04); *B29C 65/00* (2013.01); *B29L 2031/7146* (2013.01); *B60H 1/00278* (2013.01); *B60R 16/04* (2013.01); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 9,385,355 B2 | 7/2016 | Pinon et al. | |
| 9,450,275 B2 | 9/2016 | Obasih et al. | |
| 2012/0115003 A1* | 5/2012 | Park | H01M 2/105 |
| | | | 429/120 |
| 2016/0049705 A1* | 2/2016 | Mahe | H01M 10/625 |
| | | | 429/120 |
| 2016/0095264 A1 | 3/2016 | Kaneko et al. | |

FOREIGN PATENT DOCUMENTS

| | | |
|---|---|---|
| DE | 10 2013 021651 A1 | 7/2014 |
| WO | 2009/080149 A1 | 7/2009 |
| WO | 2014/154883 A1 | 10/2014 |

* cited by examiner

*Primary Examiner* — Eli S Mekhlin
(74) *Attorney, Agent, or Firm* — David B. Kelley; Carlson, Gaskey & Olds (57) ABSTRACT

This disclosure details exemplary battery pack designs for use in electrified vehicles or other electrified components. An exemplary battery pack may include a heat exchanger plate assembly having a metallic plate and a polymeric plate that are joined together to establish a coolant circuit therebetween. The metallic plate or the polymeric plate may include a protrusion that extends through an opening of the other of the metallic plate or the polymeric plate. The protrusion may either be crimped or heat staked to a surface surrounding the opening in order to join together the metallic plate and the polymeric plate of the heat exchanger plate assembly.

4 Claims, 6 Drawing Sheets

HEAT EXCHANGER PLATE ASSEMBLES FOR ELECTRIFIED VEHICLE BATTERY PACKS

TECHNICAL FIELD

This disclosure relates generally to battery packs, and more particularly to heat exchanger plate assemblies for thermally managing battery cells of battery packs.

BACKGROUND

There is a desire to reduce automotive fuel consumption and emissions. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of battery cells that store energy for powering the electrical loads. The battery cells generate heat during charging and discharging operations. This heat must be dissipated in order to achieve a desired level of battery performance. Heat exchanger plates, often referred to as "cold plates," may be used to dissipate the heat generated by the battery cells.

SUMMARY

A battery pack according to an exemplary aspect of the present disclosure includes, among other things, a heat exchanger plate assembly including a metallic plate and a polymeric plate connected to the metallic plate. A protrusion of the metallic plate or the polymeric plate extends through an opening of the other of the metallic plate or the polymeric plate.

In a further non-limiting embodiment of the foregoing battery pack, the protrusion and the opening establish a center connection of the heat exchanger plate assembly.

In a further non-limiting embodiment of either of the foregoing battery packs, a tab of the metallic plate and an outer edge of the polymeric plate establish an edge connection of the heat exchanger plate assembly.

In a further non-limiting embodiment of any of the foregoing battery packs, a bent portion of the protrusion abuts against a surface that surrounds the opening.

In a further non-limiting embodiment of any of the foregoing battery packs, the protrusion is part of the metallic plate and the opening is part of the polymeric plate.

In a further non-limiting embodiment of any of the foregoing battery packs, the protrusion is part of the polymeric plate and the opening is part of the metallic plate.

In a further non-limiting embodiment of any of the foregoing battery packs, the protrusion and the opening are disposed near a centerline axis of the heat exchanger plate assembly.

In a further non-limiting embodiment of any of the foregoing battery packs, the protrusion includes a first length that is less than a second length of the opening, and the second length of the opening is less than a third length of the heat exchanger plate assembly.

In a further non-limiting embodiment of any of the foregoing battery packs, the polymeric plate includes at least one recessed portion that establishes an open space between the metallic plate and the polymeric plate for circulating a coolant.

In a further non-limiting embodiment of any of the foregoing battery packs, the battery pack includes a coolant circuit between the metallic plate and the polymeric plate.

In a further non-limiting embodiment of any of the foregoing battery packs, the battery pack includes a seal circumscribing the coolant circuit and disposed between the polymeric plate and the metallic plate.

In a further non-limiting embodiment of any of the foregoing battery packs, the polymeric plate includes at least one stiffening rib.

In a further non-limiting embodiment of any of the foregoing battery packs, the metallic plate includes at least one thermal enhancement rib, fin, pin, or dimple.

In a further non-limiting embodiment of any of the foregoing battery packs, a battery array is positioned adjacent to or directly against the heat exchanger plate assembly.

In a further non-limiting embodiment of any of the foregoing battery packs, the opening is a slot.

A method according to another exemplary aspect of the present disclosure includes, among other things, inserting a protrusion of one of a metallic plate or a polymeric plate of a heat exchanger plate assembly through an opening of the other of the metallic plate or the polymeric plate, and crimping or heat staking the protrusion to a surface surrounding the opening, thereby joining together the metallic plate and the polymeric plate.

In a further non-limiting embodiment of the foregoing methods, the method includes crimping a tab of the metallic plate to an outer edge of the polymeric plate.

In a further non-limiting embodiment of either of the foregoing methods, the metallic plate is an extruded plate and the polymeric plate is a molded plate.

In a further non-limiting embodiment of any of the foregoing methods, crimping the protrusion to the surface includes bending the protrusion until the protrusion abuts against the surface.

In a further non-limiting embodiment of any of the foregoing methods, heat staking the protrusion to the surface includes heating the protrusion and pressing the protrusion against the surface.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are somehow incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles or other electrified components. An exemplary battery pack may include a heat exchanger plate assembly having a metallic plate and a polymeric plate that are joined together to establish a coolant circuit therebetween. The metallic plate or the polymeric plate may include a protrusion that extends through an opening of the other of the metallic plate or the polymeric plate. The protrusion may either be crimped or heat staked to a surface surrounding the opening in order to join together the metallic plate and the polymeric plate of the heat exchanger plate assembly. These and other features are discussed in greater detail in the following paragraphs of this detailed description.

Figure 1:
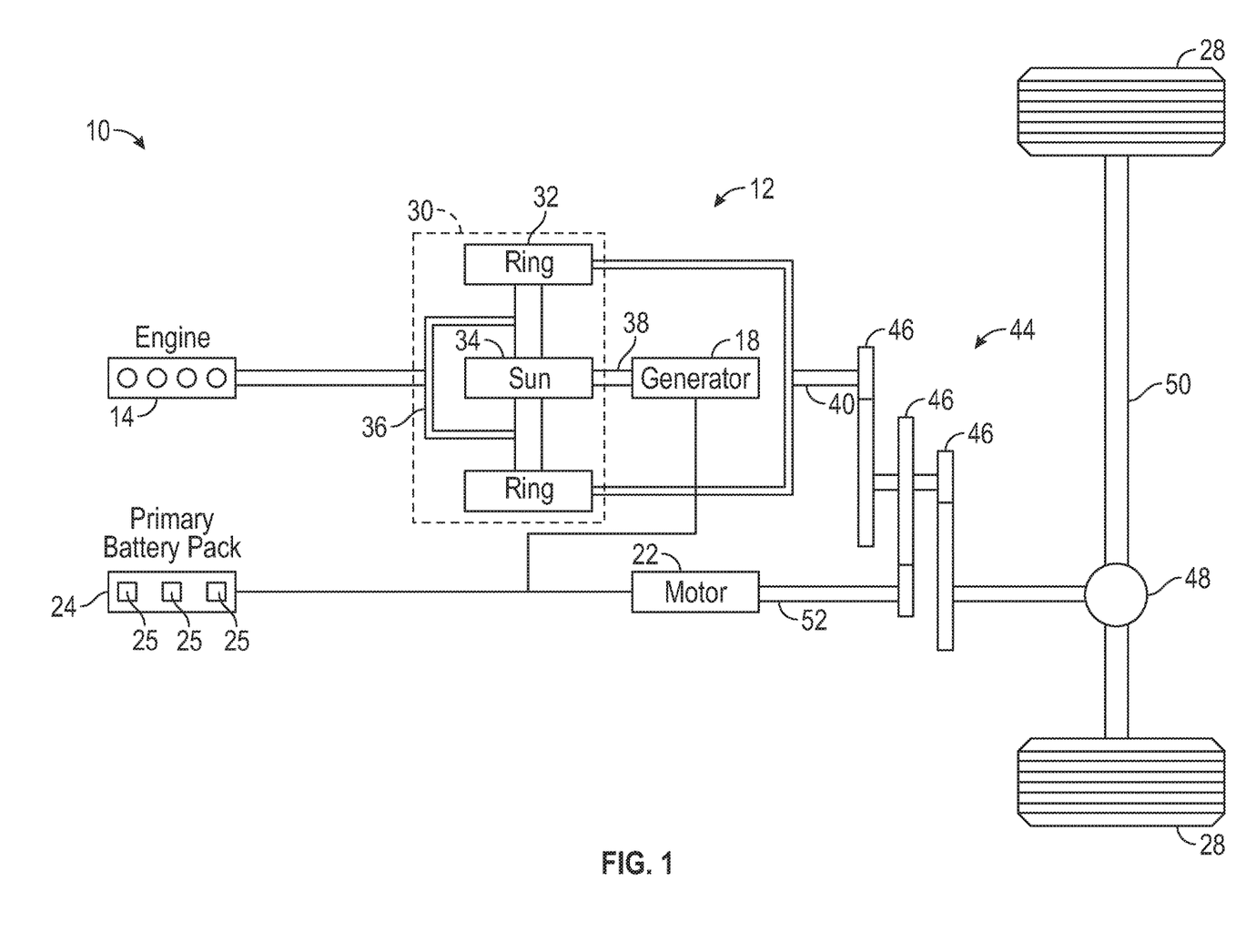
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system may include a combination of an engine 14 and a generator 18 (i.e., a first electric machine). The second drive system may include at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In an embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In an embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In an embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle traction battery. The battery pack 24 may be a high voltage traction battery that includes a plurality of battery arrays 25 (i.e., battery assemblies or groupings of battery cells) capable of both outputting electrical power to operate the motor 22 and/or other electrical loads of the electrified vehicle 12 and receiving power from the generator 18. Other types of energy storage devices and/or output devices could also be used to electrically power the electrified vehicle 12, including low voltage batteries.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
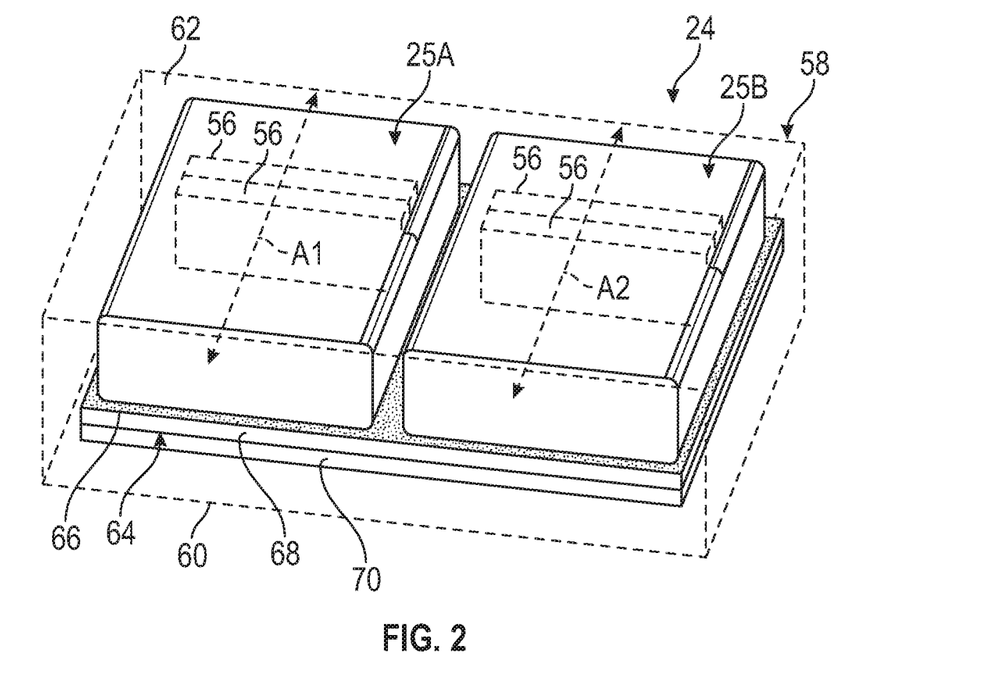
FIG. 2 illustrates an exemplary battery pack for an electrified vehicle.

FIG. 2 schematically illustrates a battery pack 24 that can be employed within an electrified vehicle. For example, the battery pack 24 could be part of the powertrain 10 of the electrified vehicle 12 of FIG. 1 or any other electrified powertrain. FIG. 2 is a perspective view of the battery pack 24, and some external components (e.g., an enclosure assembly 58) are shown in phantom to better illustrate the internal contents of the battery pack 24.

The battery pack 24 houses a plurality of battery cells 56 (also shown in phantom) that store energy for powering various electrical loads of the electrified vehicle 12. The battery pack 24 could employ any number of battery cells 56 within the scope of this disclosure. Thus, this disclosure is not limited to the exact configuration shown in FIG. 2.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array. The battery pack 24 of FIG. 2 includes a first battery array 25A and a second battery array 25B that is adjacent to the first battery array 25A. Although the battery pack 24 of FIG. 2 is depicted as including two battery arrays, the battery pack 24 could include a greater or fewer number of battery arrays within the scope of this disclosure.

The battery cells 56 of the first battery array 25A may be distributed along a first longitudinal axis A1, and the battery cells 56 of the second battery array 25B may be distributed along a second longitudinal axis A2. In an embodiment, the first longitudinal axis A1 is laterally spaced from the second longitudinal axis A2. The first and second battery arrays 25A, 25B are therefore positioned side-by-side relative to one another inside the battery pack 24 in this embodiment.

An enclosure assembly 58 may house each battery array 25A, 25B of the battery pack 24. The enclosure assembly 58 may be a sealed enclosure that includes a tray 60 and a cover 62 that is secured to the tray 60 to enclose and seal each battery array 25A, 25B of the battery pack 24. In an embodiment, the first and second battery arrays 25A, 25B are both positioned over the tray 60 of the enclosure assembly 58, and the cover 62 may be received over the first and second battery arrays 25A, 25B. The enclosure assembly 58 may include any size, shape, and configuration within the scope of this disclosure.

Each battery array 25A, 25B of the battery pack 24 may be positioned relative to one or more heat exchanger plate assemblies 64, sometimes referred to as cold plates or cold plate assemblies, such that the battery cells 56 are either in direct contact with or in close proximity to at least one heat exchanger plate assembly 64. In an embodiment, the battery arrays 25A, 25B are positioned on top of the heat exchanger plate assembly 64.

Figure 3:
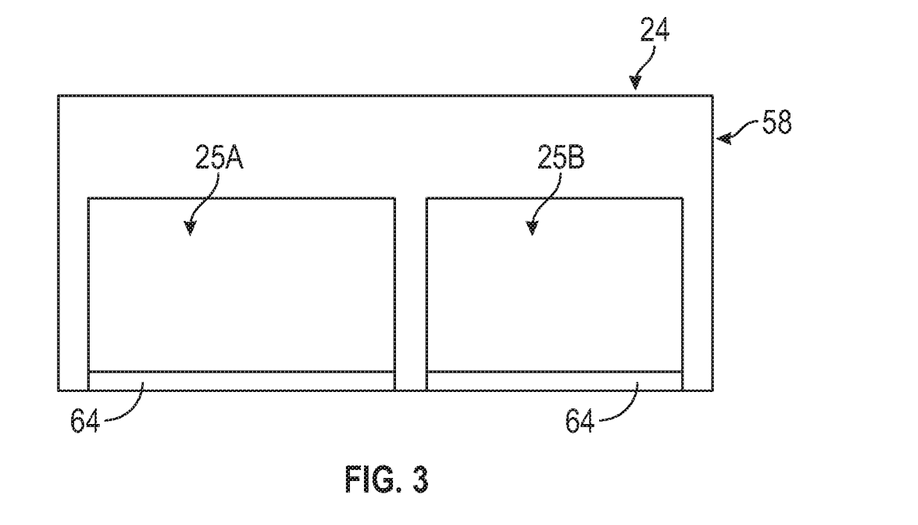
FIG. 3 illustrates another exemplary battery pack.

In an embodiment, the battery arrays 25A, 25B share a common heat exchanger plate assembly 64 (see, e.g., FIG. 2). Alternatively, each battery array 25A, 25B could be positioned relative to its own heat exchanger plate assembly 64 (see, e.g., FIG. 3).

As schematically shown in FIG. 2, a thermal interface material (TIM) 66 may optionally be positioned between the battery arrays 25A, 25B and the heat exchanger plate assembly 64 such that exposed surfaces of the battery cells 56 are in direct contact with the TIM 66. The TIM 66 maintains thermal contact between the battery cells 56 and the heat exchanger plate assembly 64, thereby increasing the thermal conductivity between these neighboring components during heat transfer events.

The TIM 66 may be made of any known thermally conductive material. In an embodiment, the TIM 66 includes an epoxy resin. In another embodiment, the TIM 66 includes a silicone based material. Other materials, including thermal greases, may alternatively or additionally make up the TIM 66.

The heat exchanger plate assembly 64 may be part of a liquid cooling system that is associated with the battery pack 24 and is configured for thermally managing the battery cells 56 of each battery array 25A, 25B. For example, heat may be generated and released by the battery cells 56 during charging operations, discharging operations, extreme ambient conditions, or other conditions. It may be desirable to remove the heat from the battery pack 24 to improve capacity, life, and performance of the battery cells 56. The heat exchanger plate assembly 64 is configured to conduct the heat out of the battery cells 56. In other words, the heat exchanger plate assembly 64 may operate as a heat sink for removing heat from the heat sources (i.e., the battery cells 56). The heat exchanger plate assembly 64 could alternatively be employed to heat the battery cells 56, such as during extremely cold ambient conditions. Exemplary heat exchanger plate assembly designs for thermally managing the battery cells 56 of the battery pack 24 are further detailed below.

Figure 4:
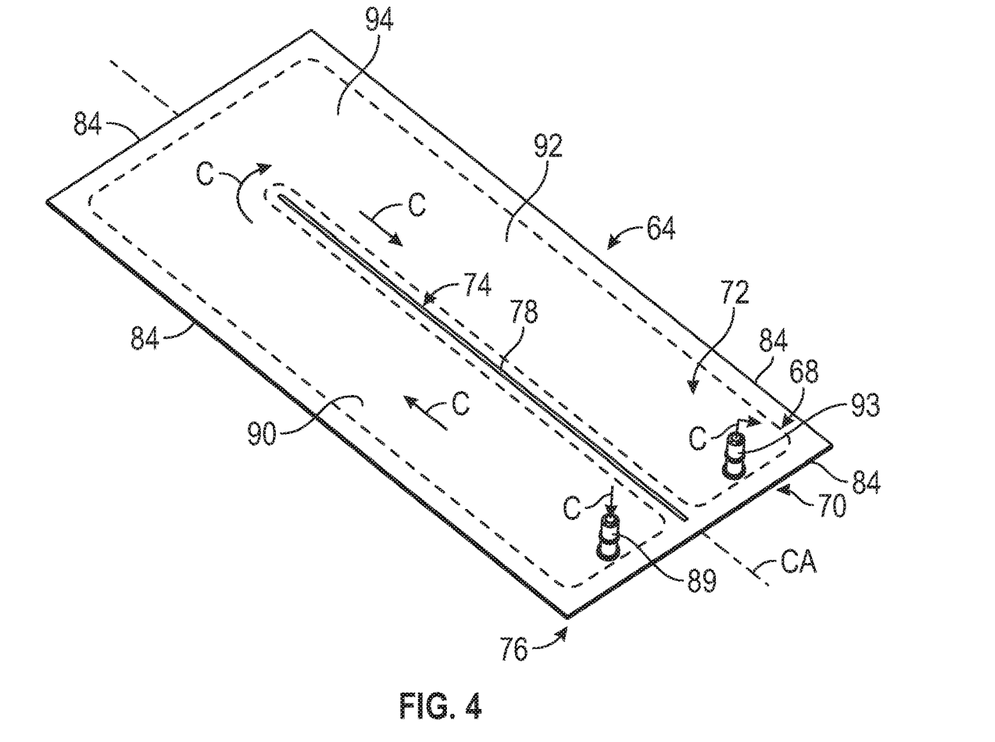
FIG. 4 illustrates a heat exchanger plate assembly according to an embodiment of this disclosure.
Figure 5:
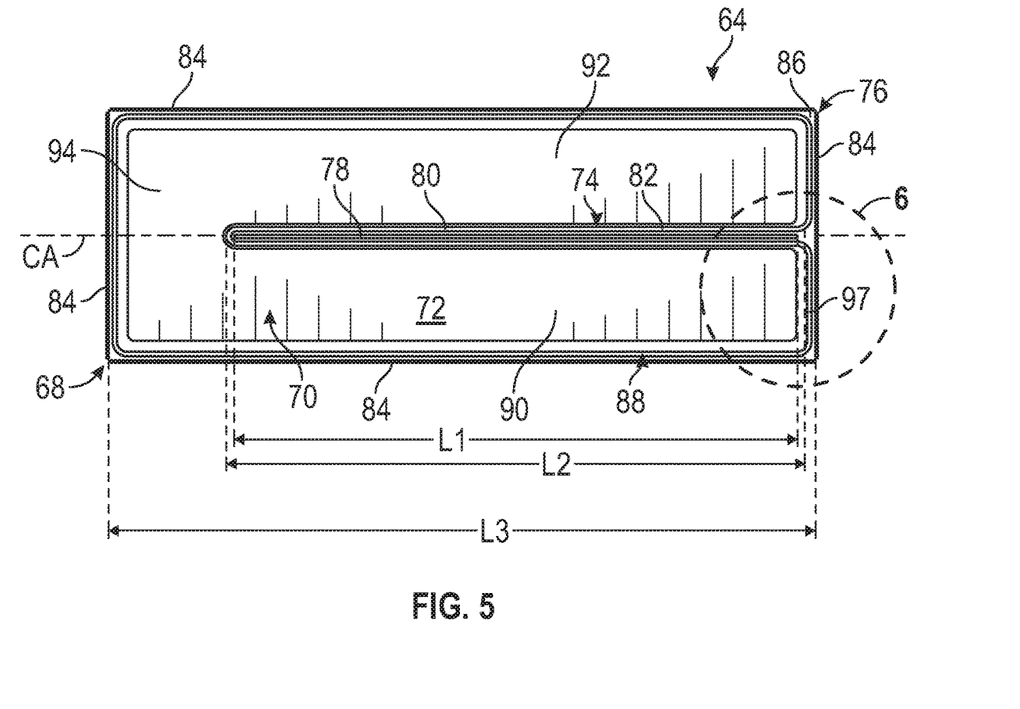
FIG. 5 is a bottom view of the heat exchanger plate assembly of FIG. 4.
Figure 6:
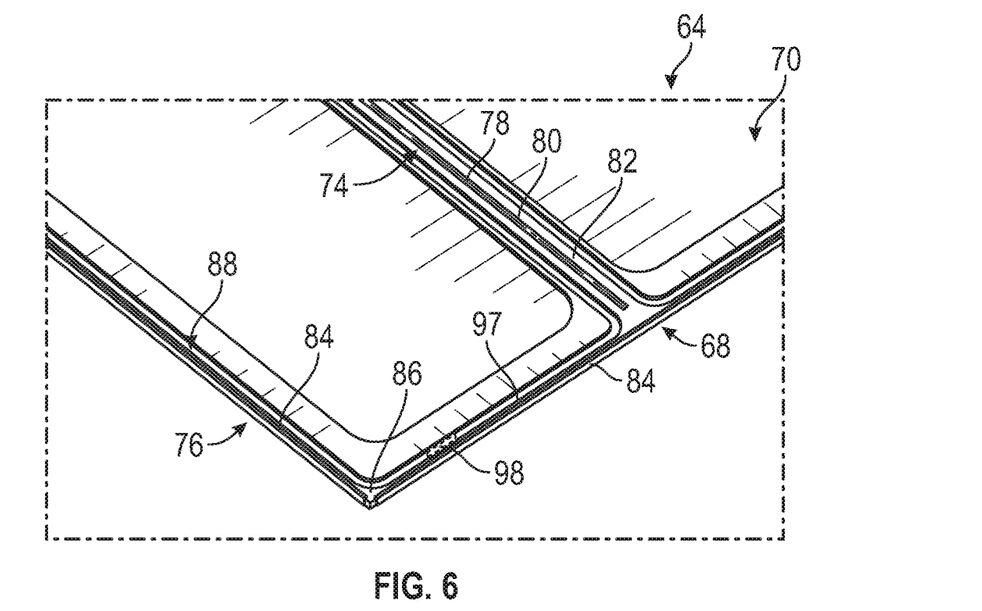
FIG. 6 is a blown-up view of a section of the heat exchanger plate assembly shown in FIG. 5.

FIGS. 4, 5, and 6 illustrate an exemplary heat exchanger plate assembly 64. The heat exchanger plate assembly 64 may include a metallic plate 68 and a polymeric plate 70 that are joined together to establish a coolant circuit 72 therebetween. When positioned within the enclosure assembly 58 of the battery pack 24, the metallic plate 68 may face toward the battery cells 56 of the battery pack 24 and the polymeric plate 70 may face toward the tray 60 of the enclosure assembly 58 (see FIG. 2). Accordingly, the metallic plate 68 may be referred to as an upper plate of the heat exchanger plate assembly 64 and the polymeric plate 70 may be referred to as a lower plate of the heat exchange plate assembly 64.

The metallic plate 68 may be made of aluminum, stainless steel, or other metallic materials or combinations of metallic materials. In an embodiment, the metallic plate 68 is an extruded part. In another embodiment, the metallic plate 68 is a stamped part. However, other manufacturing techniques and materials are also contemplated within the scope of this disclosure.

The polymeric plate 70 may be made of any suitable polymer-based material. Exemplary polymer-based materials include, but are not limited to, polypropylene, polystyrene, polyethylene, polyester, polyamine, and combinations therefore. In an embodiment, the polymeric plate 70 is a blow molded part. In another embodiment, the polymeric plate 70 is a vacuum molded part. However, other manufacturing techniques and materials are also contemplated within the scope of this disclosure.

The metallic plate 68 and the polymeric plate 70 may be joined together at both a center connection 74 and an edge connection 76. In an embodiment, the center connection 74 is established by a protrusion 78 of the metallic plate 68 and an opening 80 of the polymeric plate 70. The protrusion 78 may be received through the opening 80 and may then be folded over (e.g., bent) until it abuts against a surface 82 that surrounds the opening 80. The protrusion 78 may be bent in a crimping process, for example. In an embodiment, the opening 80 is a slot.

In an embodiment, the protrusion 78 and the opening 80 are provided near a centerline axis CA of the heat exchanger plate assembly 64 in order to establish the center connection 74. However, it is not necessary for the center connection 74 to be located at the exact center of the heat exchanger plate assembly 64. The center connection 74 could be provided at any location that is inward from the outer edges of the metallic plate 68 and the polymeric plate 70.

In another embodiment, the protrusion 78 includes a first length L1, the opening includes a second length L2, and the heat exchanger plate assembly 64 includes a third length L3 (best shown in FIG. 5). The first length L1 and the second length L2 may be less than the third length L3 to enable the formation of the coolant circuit 72. The second length L2 may be slightly larger than the first length L1 to enable the protrusion 78 to be easily received through the opening 80 during the manufacturing process.

The edge connection 76 may be established by tabs 84 of the metallic plate 68 and outer edges 86 of the polymeric plate 70. The tabs 84 may protrude from an outer periphery of the metallic plate 68. In the illustrated embodiment, the metallic plate 68 includes four tabs 84. However, a greater or fewer number of tabs may be employed within the scope of this disclosure. Each of the tabs 84 may be folded (e.g., bent) to extend around the outer edges 86 of the polymeric plate 70. The tabs 84 may be folded until they abut against an under surface 88 (see FIGS. 5 and 6) of the polymeric plate 70. The tabs 84 may be bent in a crimping process, for example.

The coolant circuit 72 may be established inside the heat exchanger plate assembly 64 once the metallic plate 68 and the polymeric plate 70 are joined together by the center connection 74 and the edge connection 76. The coolant circuit 72 may include one or more passageways that extend inside the heat exchanger plate assembly 64. The coolant circuit 72 may establish a meandering path of passageways inside the heat exchanger plate assembly 64.

In an embodiment, the coolant circuit 72 includes an inlet 89, a first linear passageway 90, a second linear passageway 92, a curved passageway 94 that connects the first linear passageway 90 to the second linear passageway 92, and an outlet 93. Other coolant circuit 72 configurations are also contemplated within the scope of this disclosure.

In use, as best shown in FIG. 4, a coolant C may enter the inlet 89 and may then circulate along a meandering path through the first linear passageway 90, the curved passageway 94, and then through the second linear passageway 92 before exiting the outlet 93 in order to dissipate heat that has been conducted into the heat exchanger plate assembly 64 from battery cells 56 of the battery pack 24. The coolant C exiting through the outlet 93 is warmer than the coolant C entering the inlet 89.

The coolant C may be communicated from a coolant source (not shown) that is either part of a main cooling system of an electrified vehicle or a dedicated coolant source of the battery pack 24. Although not shown, the coolant C may pass through a heat exchanger before entering the inlet 89 of the coolant circuit 72. In an embodiment, the coolant C is a conventional type of coolant mixture, such as water mixed with ethylene glycol. However, other coolants, including gases, are also contemplated within the scope of this disclosure.

In an embodiment, the inlet 89 and the outlet 93 are configured as tubing for receiving and discharging the coolant C from the coolant circuit 72. The inlet 89 and the outlet 93 may be separate components that are attached to the metallic plate 68 or the polymeric plate 70, or the inlet 89 and the outlet 93 could be integrally formed components of the metallic plate 68 or the polymeric plate 70.

Figure 7:
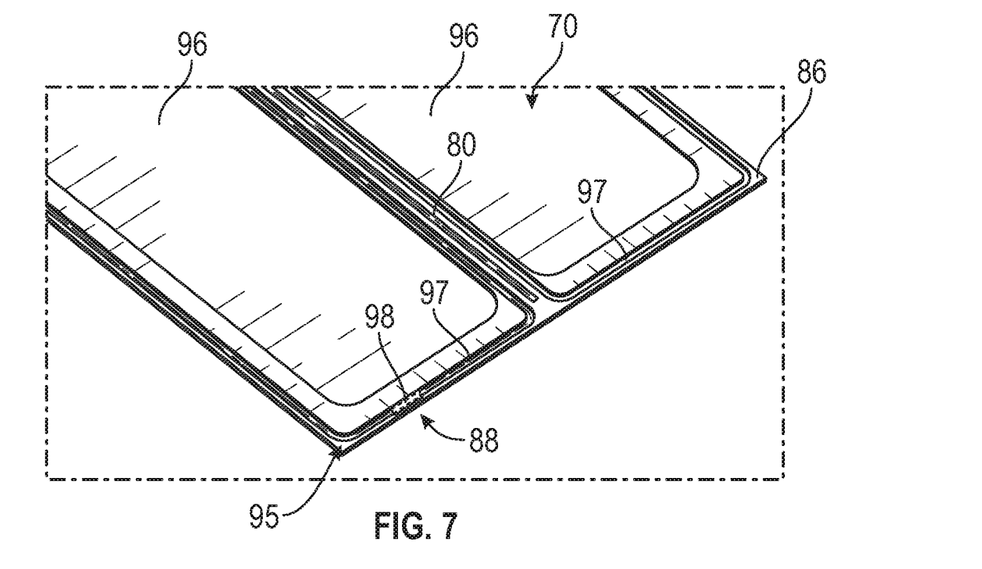
FIG. 7 illustrates portions of a polymeric plate of a heat exchanger plate assembly.

FIG. 7, with continued reference to FIGS. 5-6, illustrates an upper surface 95 of the polymeric plate 70. Once assembled, the upper surface 95 of the polymeric plate 70 faces toward the metallic plate 68.

The polymeric plate 70 may be manufactured to include features for establishing the coolant circuit 72 of the heat exchanger plate assembly 64. For example, the polymeric plate 70 may include one or more recessed portions 96 that may be recessed in a direction from the upper surface 95 toward the under surface 88 of the polymeric plate 70. The recessed portions 96 help establish open spaces between the metallic plate 68 and the polymeric plate 70 for circulating the coolant C.

The polymeric plate 70 may additionally be manufactured to include features for sealing the coolant circuit 72. For example, the polymeric plate 70 may include one or more sealing channels 97 formed in the upper surface 95. In an embodiment, the sealing channel 97 is a continuous channel that circumscribes the coolant circuit 72 of the heat exchanger plate assembly 64.

A seal 98 may be received within the sealing channel 97. The seal 98 may be an O-ring gasket seal, a dispensable liquid seal, an epoxy, or any other suitable seal. Once the heat exchanger plate assembly 64 is assembled, the seal 98 extends between the metallic plate 68 and the polymeric plate 70 to substantially prevent the coolant C from leaking out of the coolant circuit 72. If a dispensable liquid or epoxy are used as the seal 98, the seal 98 may additionally function to provide adhesion between the metallic plate 68 and the polymeric plate 70.

Figure 8:
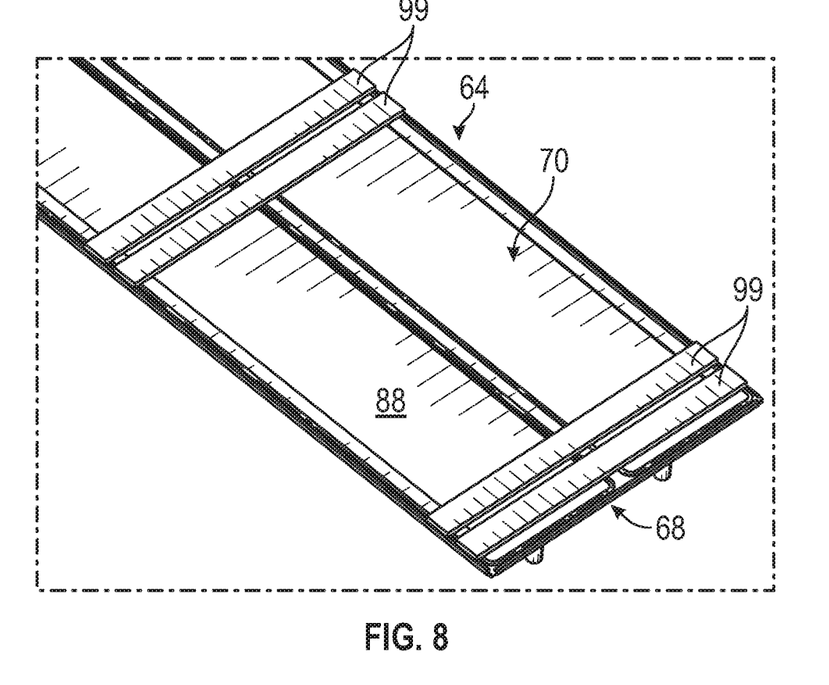
FIG. 8 illustrates additional features of a heat exchanger plate assembly.

Referring now primarily to FIG. 8, the polymeric plate 70 may additionally include one or more stiffening ribs 99 for stiffening and/or structurally supporting the polymeric plate 70. The size, shape, configuration, and mounting location of the stiffening ribs 99 are not intended to limit this disclosure. In an embodiment, the stiffening ribs 99 are over-molded onto the under surface 88 of the polymeric plate 70. However, other attachment methods could alternatively be used within the scope of this disclosure. The stiffening ribs 99 may also function to provide a suitable mounting surface for mounting the heat exchanger plate assembly 64 to the tray 60 (see FIG. 2) of the enclosure assembly 58.

Figure 9:
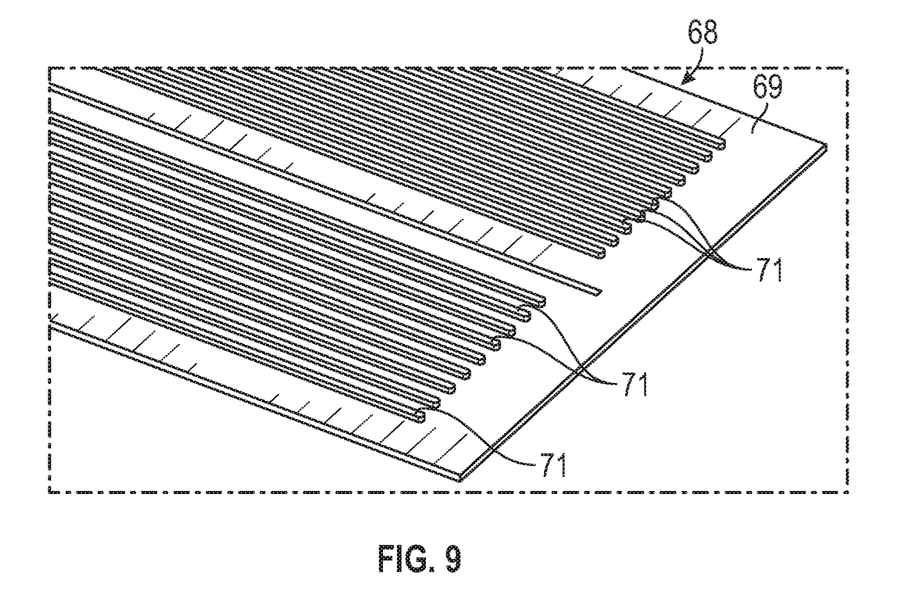
FIG. 9 illustrates portions of a metallic plate of a heat exchanger plate assembly.

FIG. 9 illustrates an inner surface 69 of the metallic plate 68. Once assembled, the inner surface 69 of the metallic plate 68 faces toward the upper surface 95 of the polymeric plate 70. One or more thermal enhancement features 71 can be provided on the inner surface 69 of the metallic plate 68. In an embodiment, the thermal enhancement features 71 are configured as ribs, fins, pins, or dimples that protrude from the inner surface 69 in order to increase the amount of available surface area for enhancing the thermal transfer between the heat exchanger plate assembly 64 and the surrounding heat sources. The thermal enhancement features 71 may be extruded features of the metallic plate 68. Alternatively, the thermal enhancement features 71 could be separate structures that are welded, brazed, or otherwise attached to the inner surface 69.

Figure 10:
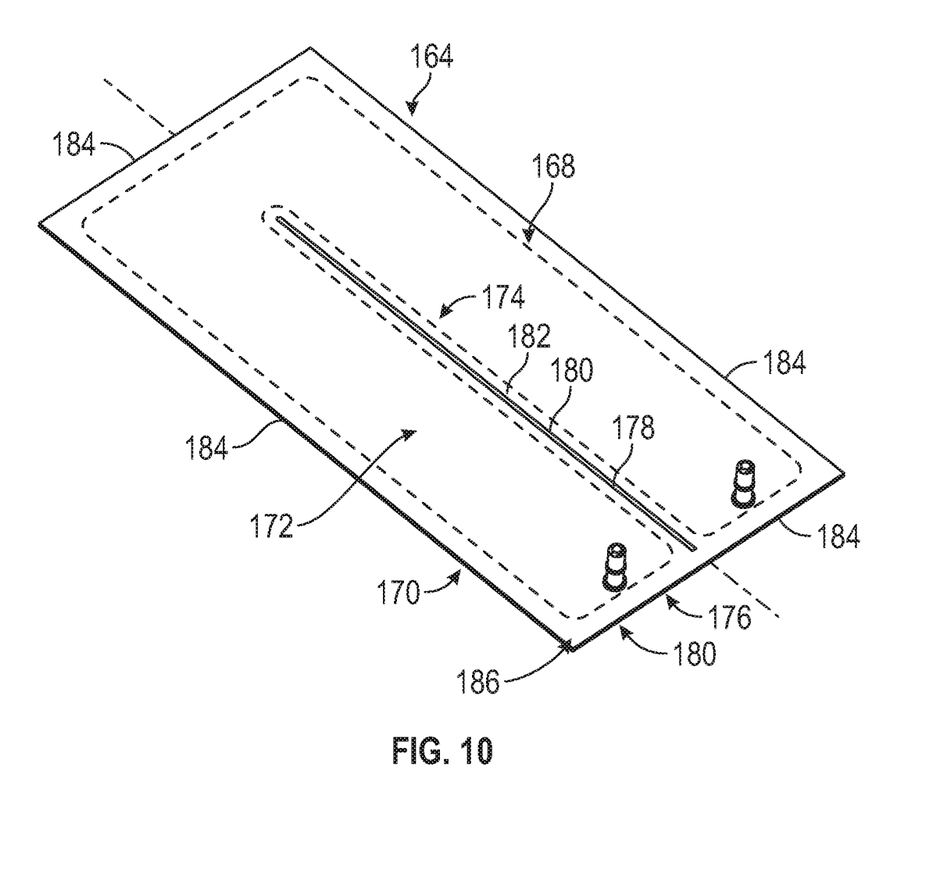
FIG. 10 illustrates a heat exchanger plate assembly according to another embodiment of this disclosure.

FIG. 10 illustrates another exemplary heat exchanger plate assembly 164. The heat exchanger plate assembly 164 may include a metallic plate 168 and a polymeric plate 170 that are joined together to establish a coolant circuit 172 therebetween.

The metallic plate 168 and the polymeric plate 170 may be joined together at both a center connection 174 and an edge connection 176. In an embodiment, the center connection 174 is established by a protrusion 178 of the polymeric plate 170 and an opening 180 (e.g., hole, slot, or other opening) of the metallic plate 168. The protrusion 178 may be received through the opening 180. The protrusion 178 may then be heated and pressed down until abuts against a surface 182 that surrounds the opening 180. In an embodiment, the process of heating and pressing the protrusion 178 is a heat staking process.

The edge connection 176 may be established by tabs 184 of the metallic plate 168 and outer edges 186 of the polymeric plate 170. Each of the tabs 184 may be folded (e.g., bent) to extend around the outer edges 186 of the polymeric plate 170. The tabs 184 may be folded until they abut against an under surface 188 of the polymeric plate 170. The tabs 184 may be bent in a crimping process, for example.

The exemplary heat exchanger plate assemblies of this disclosure combine metallic and polymeric materials in order to reduce weight and manufacturing costs associated with known heat exchanger plate designs. The heat exchanger plate assemblies described herein improve heat transfer by decreasing the amount of thermal exchange that can occur between the lower plate of the assembly and the surrounding environment. The robust and reliable connection established between the metallic plate and the polymeric plate of the described heat exchanger plate assemblies may further improve manufacturing by providing a visual confirmation of the plate attachment.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    a heat exchanger plate assembly including:
        a metallic plate;
        a polymeric plate connected to the metallic plate;
        a center connection located near a centerline axis of the heat exchanger plate assembly and including an elongated protrusion of the metallic plate extending through an elongated slot of the polymeric plate;
        an edge connection located at an outer periphery of the heat exchanger plate assembly and including a tab of the metallic plate secured around an outer edge of the polymeric plate; and
        a coolant circuit inside the heat exchanger plate assembly and including a first passageway and a second passageway,
        wherein the center connection separates the first passageway from the second passageway;
    a grouping of battery cells positioned on top of the heat exchanger plate assembly; and
    a thermal interface material disposed between the grouping of battery cells and the metallic plate of the heat exchanger plate assembly.

2. The battery pack as recited in claim 1, wherein the protrusion extends across a length that is at least 50% of an overall length of the metallic plate.

3. The battery pack as recited in claim 1, comprising a stiffening rib secured to an under surface of the polymeric plate, wherein the undersurface faces in a direction away from the metallic plate.

4. The battery pack as recited in claim 3, comprising an enclosure assembly that houses the heat exchanger plate assembly and the grouping of battery cells, wherein the enclosure assembly includes a tray and a cover secured to the tray, and further wherein the stiffening rib is received directly against the tray.

* * * * *